April 29, 1930.  E. S. JOHNSON  1,756,784
ELECTRIC TOASTER
Filed Dec. 18, 1929   2 Sheets-Sheet 1
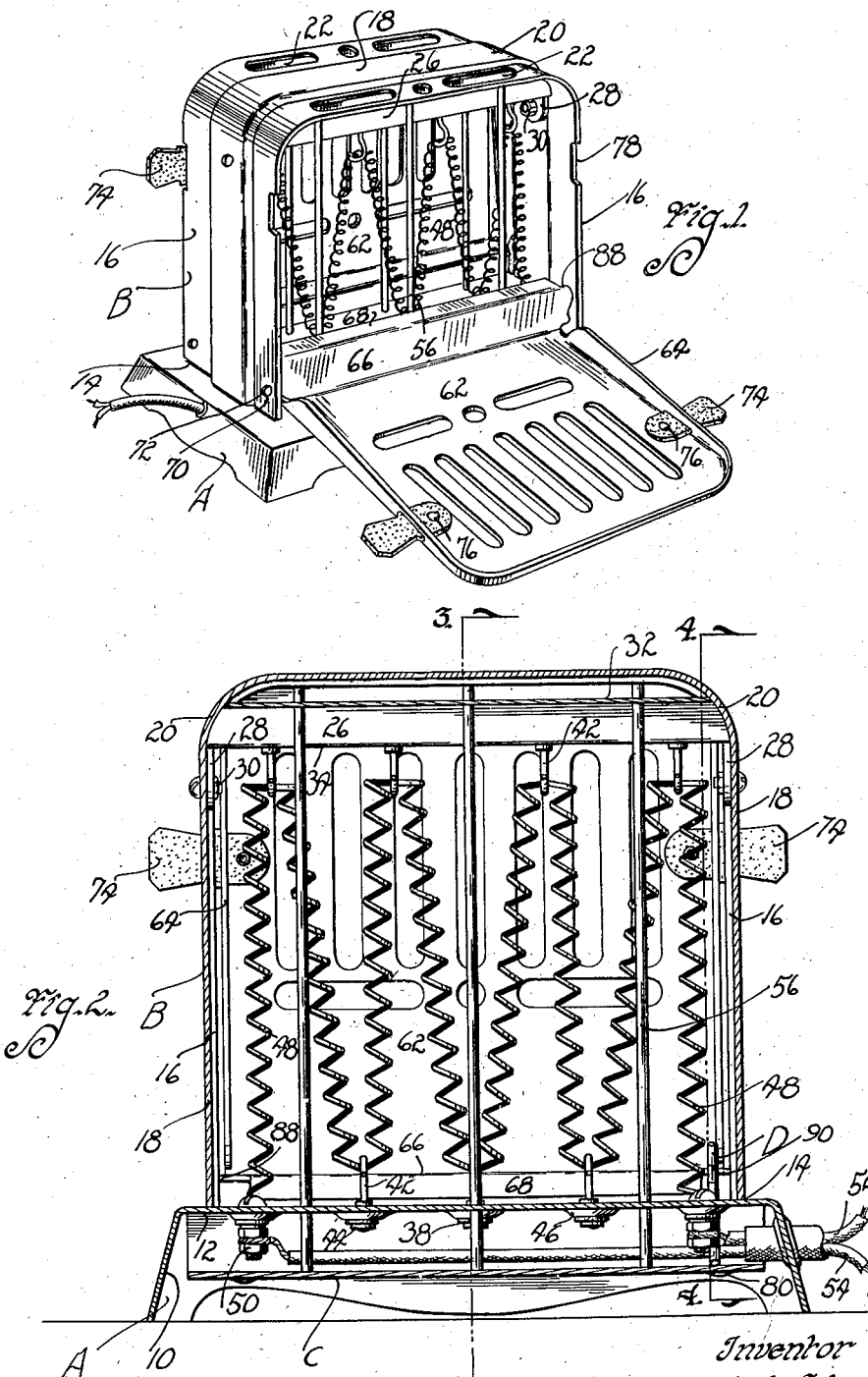
Inventor
Ernest S. Johnson
by Bair, Freeman & Sinclair
Attorneys
Witness
Edw. Leeby April 29, 1930.   E. S. JOHNSON   1,756,784
ELECTRIC TOASTER
Filed Dec. 18, 1929   2 Sheets-Sheet 2
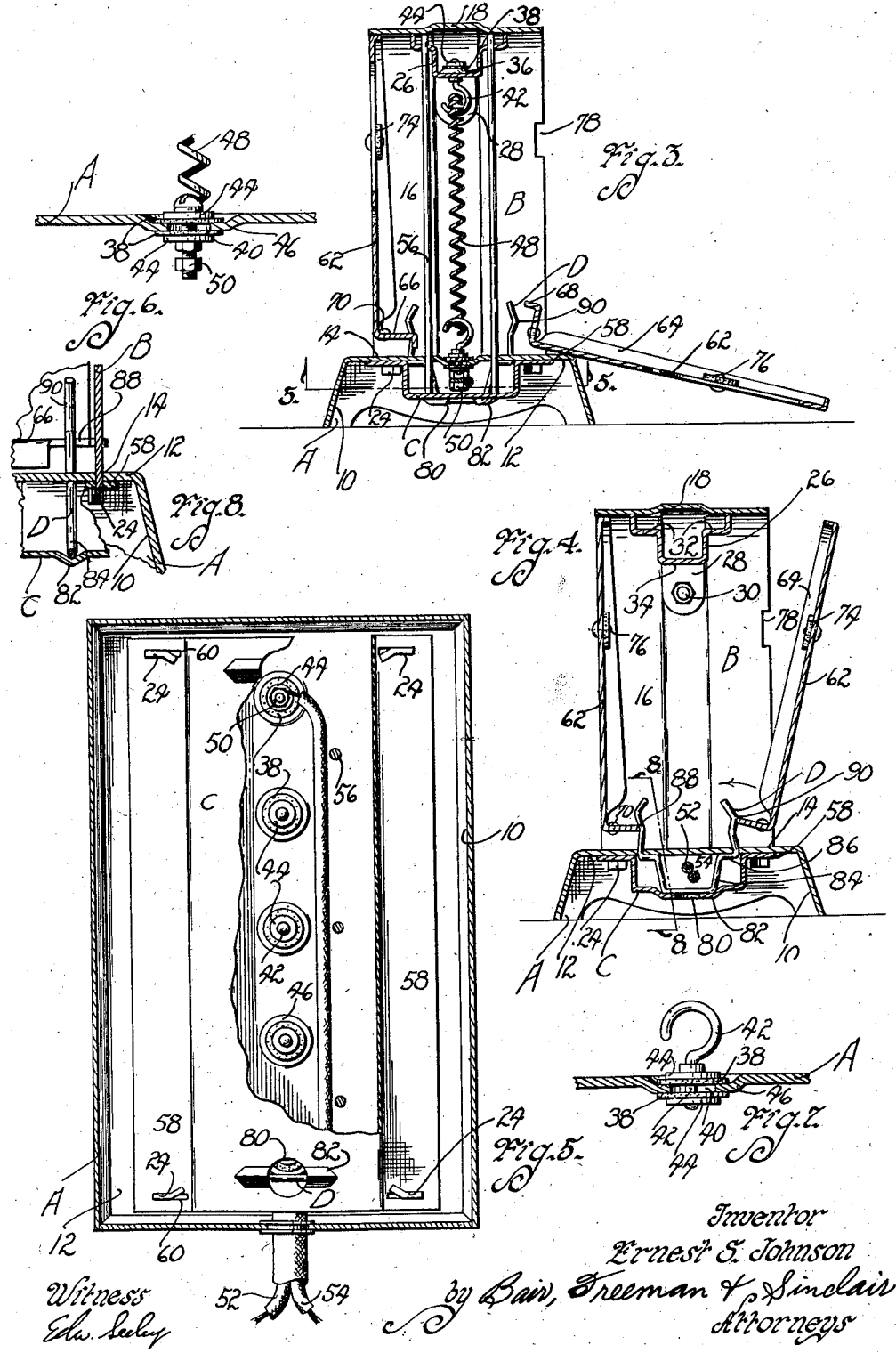
Inventor
Ernest S. Johnson
by Bair, Freeman & Sinclair
Attorneys
Witness
Edw. Seeley Patented Apr. 29, 1930

1,756,784

UNITED STATES PATENT OFFICE

ERNEST S. JOHNSON, OF WEBSTER CITY, IOWA, ASSIGNOR TO KNAPP-MONARCH COMPANY, OF WEBSTER CITY, IOWA, A CORPORATION OF DELAWARE

ELECTRIC TOASTER

Application filed December 18, 1929. Serial No. 414,952.

The object of my invention is to provide an electric toaster of simple, durable and comparatively inexpensive construction.

More particularly, it is my object to provide an electric toaster wherein the parts may be formed of metal stampings and easily and quickly assembled in position by the use of a minimum number of parts, and further so arranging the parts of the device that substantially only the removal of one member will permit the parts to be entirely disassembled, and vice versa, the other member serving as an assembly retainer for holding all of the parts in related position.

Still a further object is to provide a toaster casing or frame made of a strip of metal bent to provide a top and a pair of ends, the bottom edge of the two ends having a pair of tongues formed thereon which cooperate with an assembly member for retaining the parts in proper related position.

Still another object is to provide a spring element which coacts with a pair of hinged side walls for retaining the hinged side walls in their raised or vertical position, the spring being held in position by the assembly retainer and its cooperation with the base of the toaster itself.

With these and other objects in view, my invention consists in the construction, arrangement and combination of the various parts of my electric toaster, whereby the objects contemplated are attained, as hereinafter more fully set forth, pointed out in my claims, and illustrated in the accompanying drawings, in which:

Figure 1 is a perspective view of my toaster with one of the hinged side walls shown in open position.

Figure 2 is a central, vertical, sectional view taken through the toaster illustrating the parts in their assembled positoin.

Figure 3 is a sectional view taken on the line 3—3 of Figure 2 with one of the side walls in its open position.

Figure 4 is a vertical, sectional view taken on the line 4—4 of Figure 2 with one of the hinged side walls moved to substantially closed position, illustrating its relationship with the spring retainer.

Figure 5 is a horizontal sectional view taken on the line 5—5 of Figure 3.

Figures 6 and 7 are detail, sectional views illustrating the means employed for retaining the heating element in position within the casing outline; and Figure 8 is a detail, sectional view taken on the line 8—8 of Figure 4.

In the accompanying drawings, I have used the reference character A to indicate generally a base or support, and B a toaster frame.

The support A includes four outwardly flared side walls 10 and a base 12. The base 12 is provided with a plurality of slots 14, the purpose of which will be hereinafter more fully set forth.

The casing or frame B is formed of a single piece of sheet metal bent to provide a pair of end walls 16 and a top 18. The side walls 16 and top 18 are formed with an outwardly pressed channel 20, which serves to reinforce the casing frame. The top is also provided with a plurality of openings 22 for permitting the heat to escape from within the toaster proper The bottom edges of the end walls 16 are each provided with a pair of downwardly extending tongues 24. The tongues 24 are adapted to project through the slots 14 in the base 12, and thus the casing is held in position relative to the base 12, as will hereinafter be more fully set forth.

Within the casing B and secured to the underside of the top thereof is a stamping 26, which I will refer to as an upper retainer. The upper retainer 26 is substantially channel-shaped in cross section and provided with a pair of down-turned flanges 28, which are bolted or otherwise secured to the end walls 16. In the drawings, I have used bolts 30 for this purpose.

The upper retainer is sub-divided into a pair of flat portions 32 adjacent the center portion thereof, as clearly illustrated in Figure 4 of the drawings.

Positioned below the flat portions 32 and received therebetween is another flat portion 34. The flat portion 34 is provided with a plurality of up-struck parts 36, having a substantially enlarged central opening therein. A mica washer 36 is positioned above and below the metal forming the up-struck portion 36 and these mica washers 36 partially enclose the central opening therein. The reference numeral 40 indicates such enlarged, central opening.

Extending through the mica washers 38 is the shank of a hook 42.

A metal washer 44 is on the outside of the mica washers 38, the purpose of which is to permit the shank of the hook 42 to be securely locked rigidly thereto for retaining the hook 42 in proper position relative to the upper retainer 26.

The base 12 is formed with a plurality of down-struck depressions 46 and these depressions are each provided with an enlarged central opening 40. Hook elements 42 project through the openings and are retained therein in the same manner as has heretofore been described in connection with the hook members 42 for the upper retainer 26. The purpose of the hook member 42 is to receive the wire 48 which serves as the heating element. The depressions 46 function to center the washers 38 and thus hold the hook elements 42 free from contact with the metal around the openings 40.

Within the outer two openings of the base 12, I place a pair of bolts or terinals 50, which are connected to the two ends of the heating wire 48 and likewise connected to the two wires 52 and 54, which form the circuit and source of electric supply for the heating wire 48. The terminals 50 are insulated from the base 12 in substantially the same manner as are the hooks 42.

A plurality of grid wires 56 are arranged on each side of the heating wire 48. The grid wires 56 project up through openings formed in the flat portions 32 of the upper retainer 26. The base 12 is also provided with a plurality of openings through which the grid wires 56 pass.

In order to retain the grid wires in position and likewise to cover up the electrical connections on the under side of the base 12 and within the support A, I provide an assembly retainer C, which is channel-shaped in cross section and provided with a pair of out-turned flanges 58. The flanges 58 are each provided with a pair of slots 60, which coincide and register with the tongues 24.

After the assembly retainer C has been positioned so that the tongues 24 extend therethrough, then and thereafter the tongues 24 are bent so as to be out of register with the slots 60.

The entire device is thus held in assembled position.

A pair of hinged side walls 62 provided with a plurality of perforations or openings are used to receive and position slices of bread to be toasted. The side walls 62 are provided with inwardly extending flanges 64, which serve to reinforce the side walls and likewise to provide casings for the slices of bread when they are positioned upon the side walls.

Each side wall is also formed with a support 66 and a down-turned flange 68. The support 66 has the slice of bread resting thereon when the side wall is in vertical position.

In order to hingedly mount the side walls 62, I provide a pair of openings 70 in the end walls 16 and trunnions 72 upon the supports 66. The trunnions 72 project through the openings 70 and thus there is provided a hinged connection between the side walls 62 and the casing frame B.

The side walls are mounted in position before the tongues 24 of the casing B are projected through slots in the base 12.

The casing B being formed of sheet metal is capable of spreading a sufficient distance to permit the trunnions to be properly inserted.

I provide a plurality of finger engaging elements 74 upon each of the side walls 62. The finger elements are formed of an insulating material so as to be non-heat conducting. The finger elements 74 project through a slot formed in the flange 64 of the side wall 62, whereby a single rabbet or the like 76 may be employed for holding the finger tabs in rigid position.

The edges of the end walls 16 are notched as at 78 to receive the finger tabs 74 when the side walls are in vertical position.

In order to retain the side walls in vertical position and against accidental hinged movement, I provide a spring retainer D. The spring retainer D has a pair of ends projecting through openings formed in the base 12, as clearly illustrated in Figure 4 of the drawings. The spring retainer D includes a central portion 80, which registers with a recess 82 formed in the bottom of the assembly retainer C. The central portion 80 has a pair of upwardly projecting parts 84 and out-turned portions 86. The out-turned portions 86 rest against the underside of the base 12.

The spring retainer D is rigidly held in position against movement in any direction by the retainer assembly C and the underside of the base 12.

The portions of the spring D project up above the base 12 and cooperate with edges 88 formed on each of the side walls 62.

The spring D is bent as at 90 so as to provide a portion over which the edge 88 must travel when the side wall is moved from its open position to its vertical closed position. It will be noted that the spring is not secured to the toaster proper and is simply held in position by being retained or restricted from movement due to the entire assembly of the device.

One of the principal advantages of my device resides in the fact that I employ a single sheet metal casing which when positioned above the base 12 and secured thereto serves to practically retain all of the parts within their proper related position.

The spring D serves a very useful and desirable purpose and is efficient in operation.

Some changes may be made in the arrangement and construction of the various parts of my electric toaster without departing from the real spirit and purpose of my invention, and it is my intention to cover by my claims, any modified forms of structure or use of mechanical equivalents, which may be reasonably included within their scope.

I claim as my invention:

1. An electric toaster of the class described, comprising a base having a plurality of slots formed therein, a casing formed of a single sheet of material bent to provide a pair of ends and a top, tongues projecting downwardly from the free edge of said ends adapted to project through the base, whereby the casing and base may be connected together, and an electric heating element mounted within the casing.

2. An electric toaster of the class described, comprising a base having a plurality of slots formed therein, a casing formed of a single sheet of material bent to provide a pair of ends and a top, tongues projecting downwardly from the free edge of said ends adapted to project through the base, whereby the casing and base may be connected together, an electric heating element mounted within the casing, a pair of hinged side walls carried by said casing, and means for yieldingly retaining said side walls in vertical position.

3. An electric toaster of the class described, comprising a support, a casing formed of a single sheet of material bent to provide a pair of ends and a top, said casing having means of connection with said support, an electric heating element mounted within said casing, grid wires arranged on each side of said heating element adapted to protect toast from said heating element, and an assembly retainer adapted for positioning on the under side of the support and connected thereto by the means of connection between the casing and said support for preventing removal of said grid wires.

4. An electric toaster comprising a support, a casing formed of a single piece of material having tongues adapted to project through slots formed in said support, a pair of side walls pivotally mounted on said casing, a single spring projected through said support for coaction with said pair of side walls to retain them in vertical position, and an assembly retainer mounted on the underside of said support having means of connection with said tongues for holding said spring in position against accidental displacement.

5. An electric toaster comprising a support, a casing formed of a single piece of material having tongues adapted to project through slots formed in said support, a pair of side walls pivotally mounted on said casing and adapted when in vertical position to come within the outline of said casing, a single spring projected through said support for coaction with said pair of side walls to retain them in vertical position, and an assembly retainer mounted on the underside of said support having slots therein to receive said tongues for holding said spring in position against accidental displacement.

6. An electric toaster comprising a support, a casing formed of a single piece of material having tongues adapted to project through slots formed in said support, a pair of side walls pivotally mounted on said casing and adapted when in vertical position to come within the outline of said casing, a single spring projected through said support for coaction with said pair of side walls to retain them in vertical position, and an assembly retainer mounted on the underside of said support having slots therein to receive said tongues for holding said spring in position against accidental displacement, and when said tongues are bent to retain the casing, its support and said assembly retainer in assembled position.

7. An electric toaster of the class described comprising a support, a three-sided casing secured to said support, a pair of side walls pivotally connected to said casing, a spring having its ends projected through said support and adapted to frictionally engage portions of both of said side walls when they are moved to vertical position for retaining them in vertical position.

8. An electric toaster comprising a base having supporting means and a raised portion, a casing thereon formed of a single piece of metal, bent to provide a pair of ends and a top, an assembly retainer mounted on the underside of the raised portion of said base, a heating element mounted within the casing, and common means for rigidly connecting together the base, the casing and the assembly retainer.

9. In a toaster of the kind described, a base having a supporting portion and a raised portion, a casing thereon, an electric heating element in said casing, grid wires arranged on opposite sides of the heating element, means in the top of the casing for receiving and holding the grid wires against horizontal movement, said base being provided with openings for slidably receiving the grid wires, an assembly retainer under the raised portion of the base for engaging and supporting the grid wires and common means for rigidly securing together the base, the casing and the assembly retainer.

Des Moines, Iowa, December 9, 1929.

ERNEST S. JOHNSON.